United States Patent [19]

Ravichandran et al.

[11] Patent Number: 4,782,105

[45] Date of Patent: Nov. 1, 1988

[54] LONG CHAIN N,N,-DIALKYLHYDROXYLAMINES AND STABILIZED COMPOSITIONS

[75] Inventors: Ramanathan Ravichandran, Yonkers; Ambelal R. Patel, Ardsley; Frank P. Cortolano, Valhalla, all of N.Y.; Richard W. Thomas, Nutley, N.J.

[73] Assignee: Ciba-Geigy Corporation, Ardsley, N.Y.

[21] Appl. No.: 36,939

[22] Filed: Apr. 10, 1987

[51] Int. Cl.$^4$ ............................................... C08K 5/32
[52] U.S. Cl. ................................................... 524/236
[58] Field of Search ........................... 526/83; 524/236

[56] References Cited

U.S. PATENT DOCUMENTS

| | | | |
|---|---|---|---|
| 3,148,225 | 9/1964 | Albert | 526/83 |
| 3,222,334 | 12/1965 | Demme | 526/83 |
| 3,341,487 | 9/1967 | Albert et al. | 526/83 |
| 3,408,422 | 10/1968 | May . | |
| 3,418,295 | 12/1968 | Schoenthaler | 525/259 |
| 3,432,578 | 3/1969 | Martin . | |
| 3,644,244 | 2/1972 | Fryd et al. | 526/236 |
| 3,697,470 | 10/1972 | Haines et al. | 526/83 |
| 3,770,847 | 11/1973 | Lengnick et al. . | |
| 3,818,006 | 6/1974 | Klemchuk | 564/300 |
| 3,878,181 | 4/1975 | Mayer-Moder et al. | 526/83 |
| 3,914,211 | 10/1975 | Udding | 525/377 |
| 4,242,224 | 12/1980 | Dean II et al. . | |
| 4,298,678 | 11/1981 | McKeever . | |
| 4,316,996 | 2/1982 | Collonge et al. . | |
| 4,405,745 | 9/1983 | Mathis et al. . | |
| 4,409,408 | 10/1983 | Miller . | |
| 4,411,853 | 10/1983 | Reed et al. . | |
| 4,412,062 | 10/1983 | Reed . | |
| 4,413,081 | 11/1983 | Mathis et al. . | |
| 4,418,029 | 11/1983 | Reed et al. . | |
| 4,434,122 | 2/1984 | Reed . | |
| 4,478,969 | 10/1984 | Reed et al. . | |
| 4,543,224 | 9/1985 | Reed et al. . | |
| 4,547,532 | 10/1985 | Bednarski et al. . | |
| 4,590,231 | 5/1986 | Seltzer et al. . | |
| 4,612,393 | 9/1986 | Ravichardran et al. | 564/301 |
| 4,649,221 | 3/1987 | Ravichardran et al. | 564/301 |
| 4,696,964 | 9/1987 | Ravichardran | 564/301 |

OTHER PUBLICATIONS

L. A. Harris, et al., J. Am. Oil Chemists Soc., 43, 11 (1966).

Primary Examiner—Veronica P. Hoke
Attorney, Agent, or Firm—Luther A. R. Hall

[57] ABSTRACT

Long chain N,N-dialkylhydroxylamines represent particularly valuable stabilizers for a number of polymer substrates. Their particular value is seen in their high temperature processing stabilization of poly(arylene sulfide), such as poly(phenylene sulfide), PPS, and of selected unsaturated elastomers used to modify thermoplastics. PPS is processed at elevated temperatures (300° to 425° C.) at which temperatures it crosslinks readily. Process stabilizers can extend the time to crosslinking and hence the processibility of the PPS. Long chain N,N-dialkylhydroxylamines are very effective process stabilizers for PPS being far superior to phenolic antioxidants, phosphites or amines. The hydroxylamine derived from di(hydrogenated tallow)amine is particularly useful for this purpose.

17 Claims, No Drawings

LONG CHAIN N,N,-DIALKYLHYDROXYLAMINES AND STABILIZED COMPOSITIONS

This invention pertains to long chain N,N-dialkylhydroxylamines and to their use as process stabilizers for poly(arylene sulfides) and selected unsaturated elastomers.

BACKGROUND OF THE INVENTION

U.S. Pat. No. 4,590,231 describes the use of hydroxylamines, particularly N,N-dibenzylhydroxylamine, as process stabilizers in the presence of costabilizers, such as phenolic antioxidants, in polyolefin compositions. N,N-Dioctylhydroxylamine is disclosed and the longer chain N,N-dialkylhydroxylamines are mentioned generically.

Poly(phenylene sulfide) has become an important polymer of commerce useful in a variety of end-use applications requiring high-performance polymer properties. This involves increased risk of polymer degradation during processing and the need for adequate process stabilizers to prevent the potential polymer degradation.

U.S. Pat. Nos. 4,434,122 and 4,543,224 describe the stabilization of arylene sulfide resins using phenolic amide or ester-based antioxidants.

Evidence that the stabilization of arylene sulfide polymers has been a problem for a long time is seen by the many attempts to find an adequate stabilizer for the processing of the resins. U.S. Pat. No. 4,405,745 describes the use of alkaline earth nitrites; U.S. Pat. No. 4,411,853 teaches the use of dialkyltin dicarboxylates; U.S. Pat. No. 4,412,062 describes the use of phosphites, phenolic antioxidants and thiophthalimides; U.S. Pat. No. 4,413,081 teaches the use of Group 8 metal dihydrocarbyldithiocarbamates; U.S. Pat. No. 4,418,029 describes the use of Group IIA or IIB metal salts of fatty acids; and U.S. Pat. No. 4,478,969 teaches the use of aminotriazoles as stabilizers for the arylene sulfide resins.

U.S. Pat. No. 3,432,578 describes the stabilization of conjugated diene polymers against the adverse effects of ultraviolet llight by use of diarylhydroxylamines or of diaralkylhydroxylamines.

U.S. Pat. No. 3,408,422 describes the stabilization of unsaturated polyester compositions using various hydroxyl amines. N,N-Dialkylhydroxylamines of 1 to 12 carbon atoms are generically described. Only N,N-diethylhydroxylamine, N-methyl-N-amylhydroxylamine and N,N-dibutylhydroxylamine are mentioned.

U.S. Pat. No. 3,644,244 describes the use of hydroxylamines including the N,N-dialkylhydroxylamines as stabilizers to prevent the gelation of organosols of butadiene/acrylonitrile graft copolymers. N,N-Dialkylhydroxylamines of 2 to 12 carbon atoms are generically disclosed, but only N,N-diethylhydroxylamine is specifically mentioned.

U.S. Pat. No. 4,242,224 describes the use of dialkylhydroxylamines to reduce or retard the pink discoloration found in amine antioxidant and antiozonant emulsions used in the rubber industry. N,N-dialkylhydroxylamines of 2 to 12 carbon atoms are again generically disclosed, but only N,N-diethylhydroxylamine is specifically mentioned.

U.S. Pat. No. 4,316,996 pertains to the use of hydroxylamine compounds which can prevent the discoloration of phenolic antioxidants in rubber compositions. N,N-Dialkylhydroxylamines of 1 to 18 carbon atoms are generically described, but once again only N,N-diethylhydroxylamine is specifically mentioned.

U.S. Pat. No. 4,547,532 pertains to the use of hydroxylamines to prevent the premature increase in viscosity of polymer-based antifouling paints containing an organotin compound. N,N-Dialkylhydroxylamines of 1 to 20 carbon atoms are generically described, but only N,N-dimethylhydroxylamine, N,N-diethylhydroxylamine and N,N-dibutylhydroxylamine are specifically disclosed.

U.S. Pat. No. 4,409,408 discloses the use of N,N-dialkylhydroxylamines and tertiary alkylcatechols in stabilizing vinyl aromatic compounds, such as styrene, against premature polymerization. N,N-Dialkylhydroxylamines of 2 to 10 carbon atoms are generically disclosed. N,N-Didecylhydroxylamine is specifically mentioned, but not exemplified and the preferred N,N-dialkylhydroxylamines are of 2 to 6 carbon atoms.

None of these references describes the long chain N,N-dialkylhydroxylamines of 12 carbon atoms or more nor does any of said references suggest that the long chain N,N-dialkylhydroxylamines of the instant invention exhibit special properties not possessed by the lower alkyl N,N-dialkylhydroxylamines which are the preferred embodiments in the cited prior art.

OBJECTS OF THE INVENTION

One object of the instant invention is to provide selected long chain N,N-dialkylhydroxylamines having efficacious process stabilization properties not possessed by the lower alkyl N,N-dialkylhydroxylamines of the prior art.

Another object of this invention is to provide a stabilized composition of (a) a poly(arylene sulfide) and (b) a long chain N,N-dialkylhydroxylamine which N,N-dialkylhydroxylamine is an excellent process stabilizer for said polymer when processed at elevated temperatures.

Another object of this invention is to provide a stabilized composition of (a) an unsaturated elastomer and (b) a long chain N,N-dialkylhydroxylamine which N,N-dialkylhydroxylamine is an excellent process stabilizer for said elastomer when processed at elevated temperatures.

DETAILED DISCLOSURE

The instant invention pertains to long chain N,N-dialkylhydroxylamines which are exceptionally effective process stabilizers for poly(arylene sulfide) resins and for unsaturated elastomers. The instant invention is also to the compositions containing said long chain N,N-dialkylhydroxylamines.

The instant long chain N,N-dialkylhydroxylamines are of the formula $$T_1T_2NOH$$

wherein $T_1$ and $T_2$ are independently alkyl of 12 to 18 carbon atoms.

Preferably $T_1$ and $T_2$ are independently dodecyl, tetradecyl, hexadecyl, heptadecyl or octadecyl. Most preferably $T_1$ and $T_2$ are the alkyl mixture found in hydrogenated tallow amine.

Compounds of special interest are those where $T_1$ and $T_2$ are each dodecyl, tetradecyl, hexadecyl or octadecyl; or where $T_1$ is hexadecyl and $T_2$ is tetradecyl, heptadecyl or octadecyl; or where $T_1$ is heptadecyl and $T_2$ is octadecyl.

A typical di(hydrogenated tallow)amine has the following distribution of alkyl substituents:

| | $T_1T_2NH$ | |
|---|---|---|
| $T_1$ | $T_2$ | % |
| $C_{16}$ | $C_{14}$ | 1.9 |
| $C_{16}$ | $C_{16}$ | 12.4 |
| $C_{16}$ | $C_{17}$ | 2.8 |
| $C_{16}$ | $C_{18}$ | 36.0 |
| $C_{17}$ | $C_{18}$ | 3.9 |
| $C_{18}$ | $C_{18}$ | 39.0 |
| | other | 4.0 |

It is clear that the di(hydrogenated tallow)amine originating from animal sources may well vary somewhat in the specific distribution of alkyl substituents, but the di(hydrogenated tallow)amine contains major amounts of N,N-dihexadecylamine, N,N-dioctadecylamine and N-hexadecyl-N-octadecylamine. The individual components of the mixture can be separated by distiallation under high vacuum.

However, for the purpose of this invention, there is no need to carry out such separation and the hydroxylamine prepared from the di(hydrogenated tallow)amine represents a preferred embodiment of the present invention.

The instant long chain N,N-dialkylhydroxylamines can be prepared by a number of methods. These include (a) the oxidation of the corresponding secondary amine with aqueous hydrogen peroxide to form the desired N,N-dialkylhydroxylamine directly; (b) the addition of the secondary amine to an alpha,beta-unsaturated compound such as an alkyl acrylate to form a Michael addition product, which is in turn oxidized to the corresponding tertiary amine oxide using aqueous hydrogen peroxide, and followed by the elimination of the alpha,-beta-unsaturated compound by the Cope reaction to give the N,N-dialkylhydroxylamine; (c) the metathesis reaction between an alkyl halide and a hydroxylamine in the presence of alkali such as sodamide; and (d) the reaction of an amine with a peroxy compound, such as benzoyl peroxide, followed by saponification of the intermediate formed to the desired hydroxylamine derivative.

The intermediates used for these synthetic methods are chiefly items of commerce.

N,N-Dialkylhydroxylamines have been known to have some beneficial stabilization effects in a variety of inorganic substrates including polymers as witnessed by the earlier cited prior art references.

However, the stabilization of polymers which are processed at elevated temperatures remains a serious practical problem. This is best exemplified by the processing of poly(arylene sulfide) polymers and of unsaturated elastomers used to modify thermoplastics.

The instant invention is to stabilized compositions which comprise
(a) a poly(arylene sulfide) resin, and
(b) a stabilizing amount of a long chain N,N-dialkylhydroxylamine of the formula

$E_1E_2NOH$ wherein $E_1$ and $E_2$ are independently alkyl of 12 to 36 carbon atoms, preferably 12 to 18 carbon atoms, and most preferably the alkyl mixture found in hydrogenated tallow amine.

$E_1$ and $E_2$ are independently, for example, dodecyl, tetradecyl, hexadecyl, heptadecyl, octadecyl, eicosyl or tricontyl.

Preferably $E_1$ and $E_2$ are independently dodecyl, tetradecyl, hexadecyl, heptadecyl, octadecyl and most preferably the alkyl mixture found in hydrogenated tallow amine.

The arylene sulfide polymer is normally solid, heat curable, high molecular weight arylene sulfide polymer that can be formed into fiber or film. The arylene sulfide polymers useful in the instant invention include those having a melt flow of at least about 20 and generally in the range of about 50 to about 400 and higher (determined by the method of ASTM D 1238-70, modified to a temperature of 316° C. using a 5-kg weight, the value expressed as g/10 min.). Thus, the arylene sulfide polymers can be linear, branches or lightly crosslinked. Althouugh the method by which these polymers are produced is not critical, they are preferably made by use of a polyhalo aromatic compounds, alkali metal sulfides and organic amides. The preferred arylene sulfide polymer is poly(p-phenylene sulfide).

The instant N,N-dialkylhydroxylamines greatly aid in the processing of poly(phenylene sulfide) which is processed at elevated temperatures of 300°-425° C. The addition of a stabilizer at the 0.05 to 5% by weight, preferably 0.10 to 2.0% by weight, based on the arylene sulfide polymer, is used to prevent a change in polymer viscosity which is indicative of undesired crosslinking, gel formation, chain extension or thermo-oxidative degradation.

Any additive which can prevent or even greatly prolong the time before such a change in viscosity and the concomitant polymer crosslinking occur would be of enormous practical value in the processing of poly(-phenylene sulfide). The use of ever higher processing temperatures to shorten polymer dwell time in the processing equipment and to improve productivity puts increasing emphasis on the need for the identification of such an additive.

Various classical prior art additives such as aryl amines, organic phosphites and phenolic antioxidants have been tried with indifferent success. The best of these additives are selected phenolic antioxidants, but their process stabilization efficacy falls far short of the very demanding level of efficacy requied for an acceptable process stabilizer for poly(phenylene sulfide) or for other such polymers aprocessed at very elevated temperatures.

It is found that the hydroxylamines are effective process stbilizers for poly(phenylene sulfide), but the level of effectiveness greatly depends on the substitution on the N atom.

N,N-Diethylhydroxylamine shows minimal stabilization efficacy while N,N-dibenzylhydroxylamine exhibits process stabilization similar to that obtained using the better phenolic antioxidants.

However, when the long chain N,N-dialkylhydroxylamines are used, the level of process stabilization efficacy jumps dramatically essentially doubling the level obtained with the best commercial available phenolic antioxidant. Even with the longer chain N,N-dialkylhydroxylamines there are perceptible differences seen particularly at the more elevated processing temperatures.

At 325° C., N,N-dioctylhydroxylamine is more effective than the best phenolic antioxidant as a process stabilizer for poly(phenylene sulfide), but is still only 75% as effective as the N,N-didodecylhydroxylamine or the N,N-di(hydrogenated tallow)hydroxylamine.

At 375° C., these differences are greatly accentuated and it is clear that only the long chain N,N-dialkylhydroxylamines are acceptable process stabilizers for poly(phenylene sulfide). At 375° C., N,N-didodecylhydroxylamine is 1.67 times as effective as N,N-dioctylhydroxylamine; and N,N-di(hydrogenated tallow)hydroxylamine is 2.6 times as effective as N,N-didodecylhydroxylamine and 4.25 times as effective as N,N-dioctylhydroxylamine.

It is clear that, from the generically disclosed N,N-dialkylhydroxylamines, there is a select group of such materials which possess outstanding and unexpectedly superior properties as process stabilizers for poly(phenylene sulfide) not possessed by the N,N-dialkylhydroxylamines disclosed in the prior art.

The use of these long chain N,N-dialkylhydroxylamines permits the processing of poly(phenylene sulfide) at very elevated temperatures without crosslinking and the formation of noxious and toxic degradation products, allows the preparation of end-products from the poly(phenylene sulfide) of high quality and uniformity, and bestows economic benefits of greater productivity for this difficult polymer processing operation.

The instant invention also pertains to stabilized compositions which comprise
(a) an unsaturated elastomer, and
(b) a stabilizing amount of a long chain N,N-dialkylhydroxylamine of the formula

$E_1E_2NOH$ wherein $E_1$ and $E_2$ are independently alkyl of 12 to 36 carbon atoms, preferably 12 to 18 carbon atoms, and most preferably the alkyl mixture found in hydrogenated tallow amine.

Examples of specific meanings for $E_1$ and $E_2$ are given above.

The unsaturated elastomers useful in this invention include polybutadiene, polyisoprene, styrene-butadiene copolymers and block copolymers, ethylene-propylene terpolymer rubbers, isoprene-isobutylene copolymer rubber, acrylonitrile-butadiene copolymer rubbers, ABS, IPS, styrene-isoprene copolymers and block copolymers.

During the high temperature, high shear processing of unsaturated elastomers, said elastomers are susceptible to oxidative crosslinking which manifests itself in the formation of unwanted gel particles. These gel particles are particularly detrimental in unsaturated elastomers used to modify thermoplastics such as polystyrene, polyolefins and other resins to impart enhanced impact strength. Gel particles lower polymer clarity and lead to "fisheyes" in the finished article.

Unsaturated elastomers particularly useful in these applications are styrene-butadiene copolymers, available as Sterion from Firestone, styrene-butadiene block copolymers, available as K-resin from Phillips and as Kraton from Shell, styrene-isoprene copolymers, styrene-isoprene block copolymers, available as Kraton from Shell, and a medium cis content polybutadiene, available from Firestone as Diene 55.

Generally a combination of a phenolic antioxidant and a phosphite are used to control gel formation in these polymers during high temperature processing.

European patent application No. 79,806 describes the stabilization of such polymers using a phenolic antioxidant and a thio synergist. While such phenolic antioxidants suppress gel formation, the stabilized elastomer is susceptible to color formation on exposure to both ulraviolet and gamma irradiation. Since high levels of phosphite must be used in such systems, the relatively unstable phosphites often lead to the formation of "black specks" during high temperature processing. The phenolic antioxidants which are unstable to ultraviolet and gamma irradiation offer minimal suppression to gel formation.

It is now found that, when the phenolic antioxidant and all or part of the phosphite is replaced by from 0.05 to 1.0% by weight, preferably 0.1 to 0.25% by weight, based on the unsaturated elastomer, of a long chain N,N-dialkylhydroxylamine, both the suppression of gel formation and resistance to discoloration are achieved. It is preferred to use from 0 to 1.0% by weight, based on the unsaturated elastomer, of a phosphite concomitantly. A preferred phosphite is tris(nonylphenyl)phosphite or tris(2,4-di-tert-butylphenyl)phosphite.

EXAMPLE 1

Methyl 3-[Di-(hydrogenated tallow)amino]propionate

A mixture of 49.4 grams (0.1 mol) of di(hydrogenated tallow)amine (eq. wt. of 494 grams/mol) and 9 ml (0.1 mol) of methyl acrylate are heated to reflux. Upon completion of the addition reaction, as determined by the complete disappearance of the starting amine by thin layer chromatography (TLC) analysis, the mixture is cooled. The volatiles are removed in vacuo to give 54.4 grams (94% yield) of the above-named product as a yellow oil. IR (methylene chloride) $V_{c=o}$ 1735 cm$^{-1}$.

Analysis: Calcd for $C_{38}H_{77}NO_2$: C, 78.7; H, 13.4; N, 2.4. Found: C, 78.8; H, 13.4; N, 2.4.

EXAMPLE 2

N,N-Di(hydrogenated tallow)hydroxylamine

Into a solution of 29 grams (0.05 mol) of the product of Example 1 in 200 ml of isopropanol is added 2.4 ml (0.063 mol) of 70% aqueous hydrogen peroxide solution. After stirring at 23°-25° C. for 1 hour, an additional 1.2 ml (0.031 mol) of a 70% aqueous hydrogen peroxide solution is added. After stirring for another 1 hour at 23°-25° C., another additional 1.2 ml (0.031 mol) of 70% aqueous hydrogen peroxide is added. After a total of 18 hours stirring at 23°-25° C., the product is isolated by filtration and washed with isopropanol to give 20.9 grams (82% yield) of white solid melting at 88°-90° C.

The product (19 grams) is recrystallized from 300 ml of isopropanol to give 13.1 grams (69% recovery) of the above-named product as a white solid melting at 93°-95° C.

Analysis: Calcd for $C_{34}H_{71}NO$: C, 80.1; H, 14.0; N, 2.8. Found: C, 80.0; H, 14.3; N, 2.9.

EXAMPLE 3

2-Ethylhexyl 3-[Di-(hydrogenated tallow)amino]propionate

Following the general procedure of Example 1, 52.2 grams (0.105 mol) of di(hydrogenated tallow)amine (eq. wt. of 494 gram/mol) and 18.4 grams (0.1 mol) of 2-ethylhexyl acrylate are reacted. The reaction product is purified by high pressure liquid chromatography (HPLC) using hexane and ethyl acetate solvents on silica gel to give 40.6 grams (60% yield) of the above-named product as a colorless oil. IR (methylene chloride) $V_{c=o}$ 1735 cm$^{-1}$.

EXAMPLE 4

N,N-Di(hydrogenated tallow)hydroxylamine

Using the general procedure of Example 2, 29.7 grams (0.044 mol) of the product of Example 3 in 125 ml of isopropanol is oxidized using 2.5 ml (0.065 mol) of 70% aqueous hydrogen peroxide to yield 16.3 grams (73% yield) of the above-named product as a white solid melting at 93°–96° C.

From the HPLC purification, using hexane and ethyl acetate solvents, of the filtrate, 4.4 grams (48% yield) of 2-ethylhexyl acrylate is recovered.

EXAMPLE 5

Methyl 3-(Didodecylamino)propionate

Following the general procedure of Example 1, 75 grams (0.21 mol) of didodecylamine and 19.1 ml (0.21) of methyl acrylate or reacted to give 92.6 grams (quantitative yield) of the above-named product as a yellow oil.

This oil (5.0 grams) is purified by column chromatography using hexane and ethyl acetate solvents on silica gel to give 4.9 grams (98% recovery) of a colorless oil.

Analysis: Calcd for $C_{28}H_{57}NO_2$: C, 76.5; H, 13.1; N, 3.2. Found: C, 76.6; H, 13.0; N, 3.1.

EXAMPLE 6

N,N-Didodecylhydroxylamine

Using the general procedure of Example 2, 87.6 grams (0.2 mol) of the product of Example 5 in 800 ml of isopropanol is oxidized using 9.7 mol (0.25 mol) of 70% aqueous hydrogen peroxide solution to give 32.1 grams (44% yield) of the above-named product as a white solid melting at 85°–86° C.

Analysis: Calcd for $C_{24}H_{51}NO$: C, 78.0; H, 13.9; N, 3.8. Found: C, 78.4; H, 13.5; N, 3.7.

EXAMPLE 7

Methyl 3-(Ditetradecylamino)propionate

Following the general procedure of Example 1, 50.4 grams (0.125 mol) of ditetradecylamine and 11.1 ml (0.123 mol) of methyl acrylate are reacted to give 62.6 grams (quantitative yield) of the above-named product as a yellow oil.

This oil (5.0 grams) is purified by column chromatography using hexane and ethyl acetate solvents on silica gel to give 4.9 grams of a colorless oil.

Analysis: Calcd for $C_{32}H_{65}NO_2$: C, 77.5; H, 13.2; N, 2.8. Found: C, 77.8; H, 13.4; N, 3.0.

EXAMPLE 8

N,N-Ditetradecylhydroxylamine

Using the general procedure of Example 2, 57.5 grams (0.116 mol) of the product of Example 7 in 450 ml of isopropanol is oxidized using 5.6 ml (0.15 Mol) of 70% aqueous hydrogen peroxide solution to give 21.5 grams (44% yield) of the above-named product as a white solid melting at 94°–96° C.

Analysis: Calcd for $C_{28}H_{59}NO$: C, 79.0; H, 14.0; N, 3.3. Found: C, 79.2; H, 14.0, N, 3.2.

EXAMPLE 9

N,N-Di(hydrogenated tallow)hydroxylamine

Into a solution of 100 grams (0.18 mol) of di(hydrogenated tallow)amine (494 eq. wt., 90% wt., 90% secondary amine) in 400 ml of n-butanol at 55° C. is added 8.6 ml (0.22 mol) of 70% aqueous hydrogen peroxide solution. The reaction is complete when all the hydrogen peroxide is consumed as determined by titration of an aliquot of the reaction mixture with potassium iodide/sulfuric acid/sodium thiosulfate.

The above-named product is isolated from the reaction mixture by filtration. The filter cake is washed with two 50 ml portions of n-butanol at 55° C.; then dried to give the desired product in a yield of 63 grams (68%) as a white solid melting at 93°–96° C.

EXAMPLE 10

N,N-Di(hydrogenated tallow)hydroxylamine

Following the general procedure of Example 9, to a solution of 52.6 grams (0.09 mol) of di(hydrogenated tallow)amine (526 eq. wt, 90% secondary amine) dissolved in 200 ml of n-butanol at 55° C. is added 5.3 ml (0.14 mol) of 70% aqueous hydrogen peroxide solution. During the course of the reaction three additional 0.5 ml (0.01 mol) portions of 70% aqueous hydrogen peroxide solution are added after 22, 24 and 72 hours.

The progress of the reaction is followed by thin layer chromatography (TLC) (silica gel; chloroform/acetic acid 98/2). The reaction is complete when all the starting amine has disappeared by the TLC analysis.

The above-named product is isolated from the reaction mixture by filtration. The filter cake is washed with 100 ml of n-butanol at 55° C., and then with two 200 ml portions of methanol at ambient temperature to give the desired product in a yield of 27.6 grams (57%) as a white solid melting at 98°–100° C.

EXAMPLE 11

N,N-Di(hydrogenated tallow)hydroxylamine

Following the general procedure of Example 9, to 200 grams (0.36 mol) of di(hydrogenated tallow)amine (494 eq. wt. 90% secondary amine) suspended in 800 ml of ethanol at 55° C. is added 29.4 ml (0.77 mol) of 70% aqueous hydrogen peroxide solution. After stirring for 18 hours at 55° C., the reaction mixture is filtered and the moist filter cake is recrystallized from 1000 ml of hexane. The recrystallized material is washed with 500 ml of hexane at 55° C. The above-named product is obtained in a yield of 123 grams (66%) as a white solid melting at 90°–93° C.

EXAMPLE 12

N,N-Dihexadecylhydroxylamine

The general procedure of Example 11 is followed using 100 grams (0.19 mol) of dihexadecylamine (451 eq. wt., 88% secondary amine, 30.2 grams (0.44 mol) of 50% aqueous hydrogen peroxide solution and 400 ml of ethanol. After stirring for 48 hours, the reaction mixture is filtered to give the above-named product which is twice recrystallized from 500 ml of chloroform. The desired product is obtained in a yield of 29.4 grams (32%) as white needles melting at 97°–99° C.

Analysis: Calcd for $C_{32}H_{67}NO$: C, 79.8; H, 14.0; N, 2.0. Found: C, 79.5; H, 14.0; N, 2.7.

EXAMPLE 13

N,N-Didodecylhydroxylamine

Following the general procedure of Example 12, to a solution of 50 grams (0.14 mol) of didodecylamine dissolved in 200 ml of n-propanol at 40° C. is added dropwise 9.62 grams (0.14 mol) of 50% aqueous hydrogen peroxide solution. After 72 hours at 40°-45° C., the reaction mixture is filtered to give a crude product which is subsequently recrystallized from 300 ml of hexane. The above-named product is obtained in a yield of 24.8 grams (48%) as white needles melting at 90°-92° C.

Analysis: Calcd for $C_{24}H_{51}NO$: C, 78,0; H, 13.9; N, 3.8. Found: C, 78.0; H, 14.2; N, 3.7.

EXAMPLE 14

N,N-Ditetradecylhydroxylamine

The general procedure of Example 12 is followed using at 50° to 55° C. 50 grams (0.12 mol) of ditetradecylamine, 200 ml of n-propanol and 8.3 grams (0.12 mol) of 50% aqueous hydrogen peroxide solution. The above-named product is obtained in a yield of 33.4 grams (64%) as white needles melting at 97°-99° C.

EXAMPLE 15

Stabilization of Poly(phenylene sulfide) at 325° C.

Unstabilized poly(phenylene sulfide) (Ryton #62515, amount in parts per hundred weight (phr) of the test additive. 50 Grams of the blend of poly(phenylene sulfide) and additive are added to a Brabender Plasti-Corder which has been preheated to 325° C. for three minutes.

The Plasti-Corder is operated at 325° C. at 60 rpm in the 0 to 1000 Torque Range (metergrams) and the increase in torque as a function of time is determined. The time for the measured torque to reach a value of 150 metergrams above the minimum value is taken as the time required for undesired crosslinking and concomitant polymer degradation to begin.

Higher numbers indicate a delay in the time required for the poly(phenylene sulfide) to thermally degrade and crosslink. The additive formulation having the higher numbers depict an additive bestowing better process stabilization to poly(phenylene sulfide).

| Additive* | Additive Concentration (phr) | Time to Reach Torque of 150 Metergrams over Minimum Torque (minutes) | Improvement in Time over control (minutes) |
|---|---|---|---|
| None | — | 8.5 | — |
| (organic phosphites) | | | |
| phosphite I | 1.0 | 10.5 | 2 |
| phosphite II | 1.0 | 16.75 | 8.25 |
| phosphite III | 1.0 | 21 | 12.5 |
| (aryl amines) | | | |
| amine I | 1.0 | 9.25 | 0.75 |
| amine II | 1.0 | 10 | 1.5 |
| amine III | 1.0 | 13.25 | 4.75 |
| (phenolic antioxidants, AO) | | | |
| AO A | 1.0 | 10.75 | 2.25 |
| AO B | 1.0 | 12 | 3.5 |
| AO C | 1.0 | 12.5 | 4 |
| AO D | 1.0 | 13 | 4.5 |
| AO E | 1.0 | 13 | 4.5 |
| AO F | 1.0 | 15.75 | 7.25 |
| AO G | 1.0 | 17.5 | 9 |
| AO H | 1.0 | 18.25 | 9.75 |
| AO J | 1.0 | 22.75 | 14.25 |
| AO K | 1.0 | 26.5 | 18 |
| (hydroxylamine, HA) | | | |
| HA 1 | 1.0 | 9.75 | 1.25 |
| HA 3 | 1.0 | 32 | 23.5 |
| HA 4 | 1.0 | 40 | 31.5 |
| HA 5 | 1.0 | 39 | 30.5 |
| HA 3 | 0.5 | 17.5 | 9 |
| HA 4 | 0.5 | 20.75 | 12.25 |
| HA 5 | 0.5 | 19 | 10.5 |
| HA 5 | 2.0 | 69 | 61.5 |
| (combination) | | | |
| AO F/HA 5 | 0.5/0.5 | 28.5 | 20 |

*phosphite I is tris(2,4-di-tert-butylphenyl) phosphite.
phosphite II is tris(nonylphenyl) phosphite.
phosphite III is 3,9-di-(2,4-di-tert-butylphenoxy)-2,4,8,10-tetraoxa-3,9-diphospha[5.5]undecane.
amine I is N—alkylphenyl-N—alkylphenylamine.
amine II is N,N—di-(p-octylphenyl)amine.
amine III is 2,2,4-trimethyl-1,2-dihydroquinoline polymer.
AO A is 2,2'-thio-bis(4,6-di-tert-butylphenol).
AO B is 2,2'-methylene-bis(4-methyl-6-tert-butylphenol).
AO C is 2-(3,5-di-tert-butyl-4-hydroxyanilino)-4,6-dioctylthio-s-triazine.
AO D is 2,6-di-tert-butyl-4-methylphenol.
AO E is 4,4'-thio-bis(2-tert-butyl-5-methylphenol).
AO F is neopentanetetrayl tetrakis(3,5-di-tert-butyl-4-hydroxyhydrocinnamate).
AO G is 2,4,6-tris(3,5-di-tert-butyl-4-hydroxybenzyl) isocyanurate.
AO H is 3,5-di-(3,5-di-tert-butyl-4-hydroxybenzyl)mesitol.
AO J is thiodiethylene bis-(3,5-di-tert-butyl-4-hydroxyhydrocinnamate).
AO K is 2,4-bis(n-octylthiomethyl)-6-methylphenol.
HA 1 is N,N—diethylhydroxylamine.
HA 3 is N,N—dioctylhydroxylamine.
HA 4 is N,N—didodecylhydroxylamine.
HA 5 is N,N—di(hydrogenated tallow)hydroxylamine as prepared in Example 9.

It is clear from the data given in the table that the hydroxylamines are clearly the process stabilizers of choice for stabilizing poly(phenylene sulfide) during processing even at rather modest temperature at 325° C. The aryl amines are essentially ineffective.

The best of organic phosphites and the best of the phenolic antioxidants provide some modest process stabilization properties for poly(phenylene sulfide), but no where near the efficacy exhibited by the longer chain N,N-dialkylhydroxylamines.

While even N,N-dioctylhydroxylamine exhibits better stabilization efficacy than the phenolic antioxidants, the still longer chain N,N-dialkylhydroxylamines of 12 carbon atoms or more exhibited another significant jump of some 33% higher stabilization properties.

EXAMPLE 16

Stabilization of Poly(phenylene sulfide) at 375° C.

Following the general procedure of Example 15, but operating the Brabender Plasti-Corder at 375° C., the ability of the test additives at a concentration of 1% by weight to prevent the thermal degradation and crosslinking of poly(phenylene sulfide) under these still more rigorous higher temperature conditions is measured.

| Additive* | Time to Reach Torque of 150 Metergrams over Minimum Torque (minutes) | Improvement in Time over Control (minutes) |
| --- | --- | --- |
| none | 5 | — |
| HA 3 | 8 | 3 |
| HA 4 | 10 | 5 |
| HA 5 | 18 | 13 |

*HA 3 is N,N—dioctylhydroxylamine.
HA 4 is N,N—didodecylhydroxylamine.
HA 5 is N,N—di(hydrogenated tallow)hydroxylamine.

It is clear from these data that when poly(phenylene sulfide) is processed at higher temperatures, such as 375° C., where considerable economic savings in terms of shorter dwell times, greater throughput unit time and the like that the longer chain N,N-dialkylhydroxylamine are particularly effective as process stabilizers for this difficultly processible polymer system. The N,N-didodecylhydroxylamine is 67% more effective than the N,N-dioctylhydroxylamine and the very long chain N,N-di(hydrogenated tallow)hydroxylamine is 260% more effective than the N,N-didodecylhydroxylamine and 425% more effective than N,N-dioctylhydroxylamine.

EXAMPLE 17

N,N-Di(hydrogenated tallow)hydroxylamine

To a suspension of 68 grams of anhydrous dibasic sodium phosphate and 25 grams of di(hydrogenated tallow)amine in 200 ml of dry tetrahydrofuran is added a solution of 12.8 grams of benzoyl peroxide in 100 ml of tetrahydrofuran over a 30-minute period. The resulting suspension is heated under reflux for 14 hours and then cooled to room temperature. The insoluble present is removed by filtration and the filtrate is concentrated under reduced pressure to give 35 grams of a pale yellow solid. Saponification of 12 grams of the benzoate prepared above with 1.89 grams of potassium hydroxide in 50 ml of tetrahydrofuran and 40 ml of methanol affords the compound mixture named in the title. Recrystallization of the crude material from isopropanol gives 7 grams of the title compound as a white solid melting at 95°–97° C.

Analysis: Calcd for $C_{34}H_{71}NO$: C, 80.1; H, 14.0; N, 2.8. Found: C, 80.2; H, 13.9; N, 2.7.

EXAMPLE 18

Process Stabilization of Styrene/Butadiene Copolymer

A solution polymerized copolymer of styrene and butadiene with a butadiene content of about 24% (K-Resin, Phillips) is mixed in a Brabender Plasti-Corder for one minute at 250° C. The copolymer contains 1.0% by weight of tris(nonylphenyl) phosphite as added by the manufacturer. The stabilizer N,N-di(hydrogenated tallow)hydroxylamine is dry blended into the styrene/butadiene copolymer at the indicated weight concentrations.

The Plasti-Corder is operated at 90 rpm in the 0 to 1000 Torque Range (metergrams), and the increase in torque as a function of time is determined. The time for the measured torque to increase 4 metergrams above the minimum value is taken as the time needed to the onset of crosslinking.

Higher numbers indicate a delay in the time required for the styrene/butadiene copolymer to degrade and to crosslink. The additive formulation containing the instant N,N-di(hydrogenated tallow)hydroxylamine exhibited excellent process stabilization for this polymer system.

| Additive* | Additive Concentration (% by wt) | Time to Reach Torque of 4 Metergrams over Minimum Torque (minutes) |
| --- | --- | --- |
| phosphite II | 1.0 | 12 |
| phosphite II plus | 1.0 | 30 |
| HA 5 | 0.10 | |

*phosphite II is tris(nonylphenyl) phosphite
HA 5 is N,N—di(hydrogenated tallow)hydroxylamine

EXAMPLE 19

Process Stabilization of Styrene/Butadiene Copolymer

Following the general method described in Example 18, the stabilizer additives are first incorporated into a solution of 100 grams of the styrene/butadiene copolymer (K-resin, Phillips) in 300 ml of cyclohexane and thoroughly mixed. The cyclohexane solvent is removed under reduced pressure at 40° C. to give the solid stabilized resin which is then treated in the Brabender Plasticorder as described in example 18.

The time required for the onset of crosslinking is determined as in Example 18. Additionally, samples of each formulation are taken from the Plasti-Corder as soon as the stabilized polymer is thoroughly mixed. These samples are converted into plaques which are exposed to the Xenon Arc Weather-Ometer for 168 hours or exposed to gamma irradiation (Co 60, 4 Mrad exposure). The color measured by the Hunter b value method for each sample is ascertained. Higher b color values indicate more color formation.

| | | | Hunter b Color | |
| --- | --- | --- | --- | --- |
| Additive* | Additive Concentration (% by wt) | Time to Reach Torque of 4 Metergrams over Minimum Torque (minutes) | After 168 hours in Xenon Arc Weather-ometer | After 4 Mrad gamma irrad |
| phosphite II | 1.0 | 12 | — | — |
| AO L | 0.25 | 14 | 3.7 | 8.5 |
| phosphite II | 1.0 | | | |
| AO M | 0.1 | 18 | 5.6 | 9.3 |
| phosphite II | 1.0 | | | |
| HA 5 | 0.1 | 33 | 4.1 | 7.5 |
| phosphite II | 1.0 | | | |
| HA 5 | 0.05 | 29 | 3.8 | 8.1 |
| AO L | 0.1 | | | |
| phosphite II | 1.0 | | | |

*phosphite II is tris(nonylphenyl) phosphite
AO L is n-octadecyl 3,5-di-tert-butyl-4-hydroxyhydrocinnamate
AO M is 2-tert-butyl-6-(2-hydroxy-3-tert-butyl-5-methylbenzyl)-4-methylphenyl acrylate
HA 5 is N,N—di(hydrogenated tallow)hydroxylamine

EXAMPLE 20

Process Stabilization of Styrene/Butadiene Copolymer

Using the procedure described in Example 19 and using a different batch of styrene/butadiene copolymer (K-resin, Phillips) which contained 0.5% by weight of tris(nonylphenyl) phosphite as received, the time for onset of crosslinking and the colors developed after exposure to 168 hours in the Xenon Arc Weather-Ometer and after exposure to 2.5 Mrad of gamma irradiation are ascertained using polymer stabilized with a number of different stabilizer combinations.

Inspection of the data given in the table below shows that the instant hydroxylamines provide considerably better process stabilization as measured by the time to the onset of crosslinking without any adverse effect on the color of the stabilized compositions.

| Additive* | Additive Concentration (% by wt) | Time to Reach Torque of 4 Metergrams over Minimum Torque (minutes) | Hunter b Color After 168 hours in Xenon Arc Weatherometer | After 2.5 Mrad gamma irrad |
|---|---|---|---|---|
| phosphite II | 0.5 | 6.5 | 6.2 | 3.0 |
| phosphite II | 1.0 | 10.5 | 6.2 | 3.6 |
| AO L phosphite II | 0.1 1.0 | 10.2 | 5.2 | 4.6 |
| AO L phosphite II | 0.25 1.0 | 12.2 | 6.4 | 4.9 |
| AO M phosphite II | 0.1 0.5 | 13.4 | 7.1 | 5.3 |
| AO M phosphite II | 0.1 1.0 | 17.0 | 5.5 | 5.0 |
| HA 4 phosphite II | 0.1 0.5 | 18.5 | 6.2 | 3.4 |
| HA 4 phosphite II | 0.1 1.0 | 22.6 | 5.3 | 3.7 |
| HA 5 phosphite II | 0.1 0.5 | 17.5 | 5.2 | 3.7 |
| HA 5 phosphite II | 0.1 1.0 | 21.0 | 6.0 | 3.8 |

*phosphite II is tris(nonylphenyl) phosphite
AO L is n-octadecyl 3,5-di-tert-butyl-4-hydroxyhydrocinnamate
AO M is 2-tert-butyl-6-(2-hydroxy-3-tert-butyl-5-methylbenzyl)-4-methylphenyl acrylate
HA 4 is N,N—didodecylhydroxylamine
HA 5 is N,N—di(hydrogenated tallow)hydroxylamine

EXAMPLE 21

Process Stabilization of Polybutadiene

Following the general procedure of Example 19, unstabilized polybutadiene having a medium cis content (Diene 55, Firestone) is admixed with the indicated amount of the N,N-di(hydrogenated tallow)hydroxylamine.

Samples (3 cm × 3 cm × 10 mm) are prepared from the polymer by compression molding (100° C. for 1 minute). The samples are placed in a 70° C. oven till the gel content reaches 15% as measured by the weight of toluene insoluble material retained on a 40 mesh screen. The time required for this level of gel to be attained is measured in days.

| Additive* | Additive Concentration (% by wt) | Time to Reach Aging at 70° C. 15% Gel on Oven (days) |
|---|---|---|
| none | — | 7 |
| HA 5 | 0.25 | 22 |

*HA 5 is N,N—di(hydrogenated tallow)hydroxylamine

Additionally the time to the onset of crosslinking in the Brabender Plasticorder at 190° C. is measured.

| Additive* | Additive Concentration (% by wt) | Time to Reach Torque of 4 Metergrams over Minimum Torque (minutes) |
|---|---|---|
| none | — | 1.0 |
| HA 5 | 0.10 | 7.0 |
| HA 5 | 0.25 | 14.0 |
| HA 5 | 0.50 | 22.0 |

*HA 5 is N,N—di(hydrogenated tallow)hydroxylamine

The addition of the instant hydroxylamine to the polybutadiene dramatically increased the time required for crosslinking or for gelation to occur.

What is claimed is:

1. A composition stabilized against thermal oxidative degradation, crosslinking, gel formation or chain extension, which comprises
   (a) a poly(arylene sulfide) resin, and
   (b) a stabilizing amount of a long chain N,N-dialkylhydroxylamine of the formula $E_1E_2NOH$ wherein $E_1$ and $E_2$ are independently alkyl of 8 to 36 carbon atoms.

2. A composition according to claim 1 where the poly(arylene sulfide) resin is poly(p-phenylene sulfide).

3. A composition according to claim 1 where in component (b) $E_1$ and $E_2$ are independently alkyl of 12 to 18 carbon atoms.

4. A composition according to claim 1 where in component (b) $E_1$ and $E_2$ are independently, tetradecyl, hexadecyl, heptadecyl or octadecyl.

5. A composition according to claim 1 where in component (b) $E_1$ and $E_2$ are the alkyl mixture found in hydrogenated tallow amine.

6. A composition according to claim 1 where in component (b) $E_1$ and $E_2$ are each dodecyl, tetradecyl, hexadecyl or octadecyl.

7. A composition according to claim 1 where in component (b) $E_1$ is hexadecyl and $E_2$ is tetradecyl, heptadecyl or octadecyl.

8. A composition according to claim 1 where in component (b) $E_1$ is heptadecyl and $E_2$ is octadecyl.

9. A composition stabilized against thermal, oxidative, light or gamma radiation induced degradation, which comprises
   (a) an ethylenically unsaturated elastomer, and
   (b) a stabilizing amount of a long chain N,N-dialkylhydroxylamine of the formula $E_1E_2NOH$ wherein $E_1$ and $E_2$ are independently alkyl of 8 to 36 carbon atoms,
   with the proviso that component (a) is not a copolymer of acrylonitrile-butadiene or a polymer of 2-chloro-1,3-butadiene.

10. A composition according to claim 9 where the unsaturated elastomer is polybutadiene, polyisoprene, styrene-butadiene copolymer or block copolymer, ethylene-propylene terpolymer, isoprene-isobutylene copolymer, or styrene-isoprene copolymer or block copolymer.

11. A composition according to claim 10 wherein the elastomer is styrene-butadiene copolymer or block copolymer, styrene-isoprene copolymer or block copolymer or polybutadiene.

12. A composition according to claim 9 where in component (b) $E_1$ and $E_2$ are independently alkyl of 12 to 18 carbon atoms.

13. A composition according to claim 9 where in component (b) $E_1$ and $E_2$ are independently dodecyl, tetradecyl, hexadecyl, heptadecyl or octadecyl.

14. A composition according to claim 9 where in component (b) $E_1$ and $E_2$ are the alkyl mixture found in hydrogenated tallow amine.

15. A composition according to claim 9 where in component (b) $E_1$ and $E_2$ are each dodecyl, tetradecyl, hexadecyl or octadecyl.

16. A composition according to claim 9 where in component (b) $E_1$ is hexadecyl and $E_2$ is tetradecyl, heptadecyl or octadecyl.

17. A composition according to claim 9 where in component (b) $E_1$ is heptadecyl and $E_2$ is octadecyl.

* * * * *